United States Patent
Rainwater

(10) Patent No.: US 10,346,183 B2
(45) Date of Patent: Jul. 9, 2019

(54) REUSABLE DYNAMIC OBJECT IN RUNTIME ENVIRONMENT

(71) Applicant: Aetna Inc., Hartford, CT (US)

(72) Inventor: Robert H. Rainwater, Manchester, CT (US)

(73) Assignee: Aetna Inc., Hartford, CT (US)

( * ) Notice: Subject to any disclaimer, the term of this patent is extended or adjusted under 35 U.S.C. 154(b) by 0 days.

(21) Appl. No.: 15/816,465

(22) Filed: Nov. 17, 2017

(65) Prior Publication Data
US 2019/0155616 A1     May 23, 2019

(51) Int. Cl.
*G06F 3/00*     (2006.01)
*G06F 9/448*     (2018.01)
*G06F 9/54*     (2006.01)

(52) U.S. Cl.
CPC .......... *G06F 9/4493* (2018.02); *G06F 9/4492* (2018.02); *G06F 9/54* (2013.01)

(58) Field of Classification Search
CPC ....................................................... G06F 9/54
USPC ....................................................... 719/310
See application file for complete search history.

(56) References Cited

U.S. PATENT DOCUMENTS

| | | | | |
|---|---|---|---|---|
| 5,511,199 A | * | 4/1996 | Anthias | G06F 9/449 719/315 |
| 7,680,875 B1 | * | 3/2010 | Shopiro | G06F 17/30893 709/200 |
| 9,529,808 B1 | * | 12/2016 | Sudarsanam | G06F 17/30088 |

OTHER PUBLICATIONS

Allen E. Sjogren, Interfacing Synchronous and Asynchronous Modules Within a High-Speed Pipeline, (Year: 1999).*

* cited by examiner

*Primary Examiner* — Lechi Truong
(74) *Attorney, Agent, or Firm* — Leydig, Voit & Mayer, Ltd.

(57) ABSTRACT

An embodiment of the disclosure provides a method for using a reusable dynamic object in a runtime environment. The method includes: (a) configuring, using an object dictionary, properties of the dynamic object; (b) setting a persistence state for the dynamic object; (c) setting a hierarchy state for the dynamic object; (d) establishing a create data buffer, a read data buffer, an update data buffer, and a delete data buffer; and (e) instantiating the dynamic object at runtime, wherein the object dictionary includes an object structure, a logical to physical mapping, a persistence configuration, and object relationships for a plurality of dynamic objects, and the create data buffer, the read data buffer, the update data buffer, and the delete data buffer execute data persistence mechanisms based on the persistence configuration of the dynamic object.

18 Claims, 3 Drawing Sheets

REUSABLE DYNAMIC OBJECT IN RUNTIME ENVIRONMENT

BACKGROUND

Development of modern software applications is highly complex and time consuming. Businesses increasingly develop and deploy larger and more complex applications. Additionally, these applications are often critical to a business's success. It is often difficult to develop these large complex applications on time, while meeting the project budget, and avoiding bugs and errors in the software application.

Approximately 80% of software development project time is spent designing, building, and testing model and controller layer objects. The model and controller layers connect the user presentation layer to the underlying data store. Attempts to streamline this process via object and relational mapping frameworks has led to highly proprietary and fragile software.

Representational state transfer (RestFUL) APIs have been developed to provide interoperability between computer systems. However, this method has added yet another layer of code to the application architecture and require even more coding and testing.

Some applications utilize common software design patterns. However, this results in highly complex, fine grained applications that cost substantially more to develop and are typically harder to understand. In addition to being more complex, much of this code is behind the scenes and has very little visible value to business users.

SUMMARY

An embodiment of the disclosure provides a method for using a reusable dynamic object in a runtime environment. The method includes: (a) configuring, using an object dictionary, properties of the dynamic object; (b) setting a persistence state for the dynamic object; (c) setting a hierarchy state for the dynamic object; (d) establishing a create data buffer, a read data buffer, an update data buffer, and a delete data buffer; and (e) instantiating the dynamic object at runtime, wherein the object dictionary includes an object structure, a logical to physical mapping, a persistence configuration, and object relationships for a plurality of dynamic objects, and the create data buffer, the read data buffer, the update data buffer, and the delete data buffer execute data persistence mechanisms based on the persistence configuration of the dynamic object.

Another embodiment of the disclosure provides a server for using a reusable dynamic object in a runtime environment. The server includes a processor and a non-transitory computer readable medium containing instructions stored thereon, such that when the instructions are executed by the processor, the server performs the method including: (a) configuring, using an object dictionary, attributes of the dynamic object; (b) setting a persistence state for the dynamic object; (c) setting a hierarchy state for the dynamic object; (d) establishing a create data buffer, a read data buffer, an update data buffer, and a delete data buffer; and (e) instantiating the dynamic object at runtime, wherein the object dictionary includes an object structure, a logical to physical mapping, a persistence configuration, and object relationships for a plurality of dynamic objects, and the create data buffer, the read data buffer, the update data buffer, and the delete data buffer execute data persistence mechanisms based on the persistence configuration of the dynamic object.

BRIEF DESCRIPTION OF THE SEVERAL VIEWS OF THE DRAWING(S)

DETAILED DESCRIPTION

Figure 1:
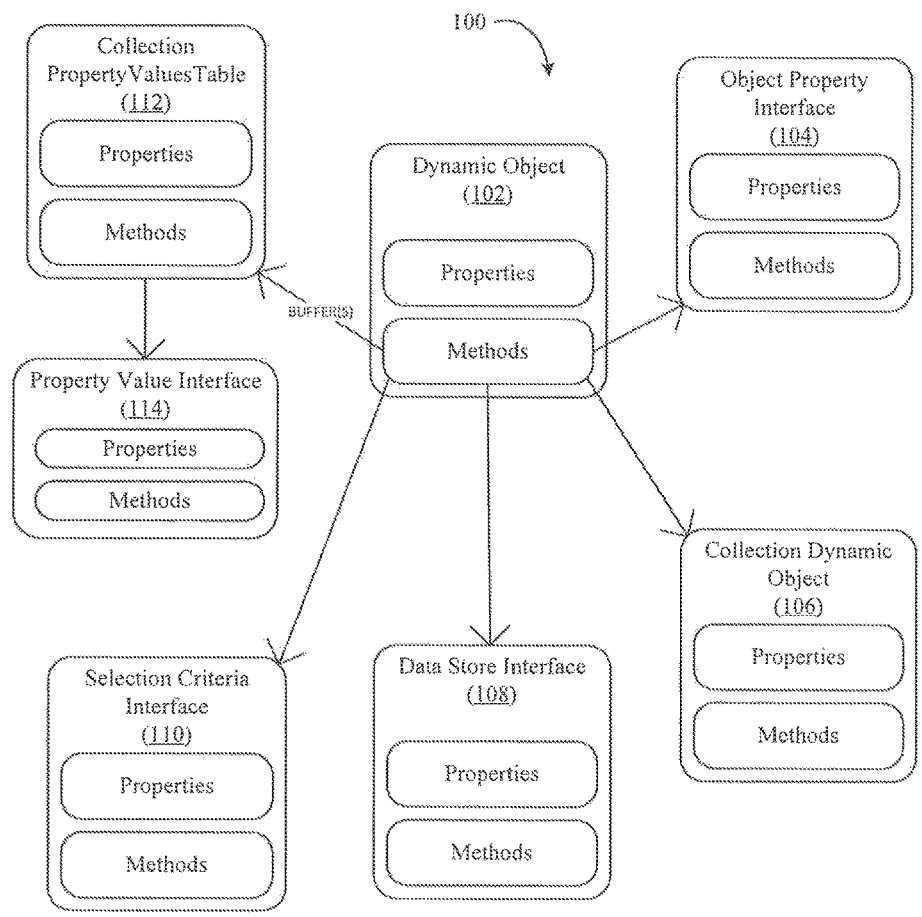
FIG. 1 illustrates a high level dynamic object that stores abstract class definitions according to some embodiments.

Embodiments of the disclosure provide a dynamic object software component. A dynamic object is a runtime software component that implements model driven development concepts. Dynamic objects streamline application development time, reduce runtime resources, and provide a conceptual programming model. Dynamic objects further provide a mechanism for rapidly transforming business requirements into software code.

In some embodiments, a dynamic object encapsulates numerous other objects. For example, a dynamic object may encapsulate a data access object, a value object, an object factory, and facade design patterns according to industry standard design patterns. A data access object may be defined as an object that provides an interface to a database or another persistence mechanism. A value object is an immutable object. An object factory is an object used to create other objects. A façade design pattern is an object that provides a simplified interface to a larger or complex body of code. A dynamic object may inherit its structure from an object dictionary or another dynamic object. Further, a dynamic object can represent persistent or non-persistent business objects. Dynamic objects when instantiated at runtime are called business objects. Physical models and persistence mechanisms may be embedded in the dynamic object. Thus, a common set of mechanisms and features may be provided regardless of the data storage or synchronization mechanisms. For example, the dynamic object may implement SQL (structured query language), flat file, middleware, EJB (enterprise java bean), or other persistence mechanics vis a common set of features and mechanisms. An application developer is therefore, not responsible for writing any of the persistence code. The underlying code is transparent to the application developer.

Dynamic objects provide a streamlined application architecture referred to as a Dynamic Application which provides the core application infrastructure for client server, web, desktop, or distributed applications. Multiple Dynamic Applications can communicate via middleware providing a shared data state across the multiple Dynamic Applications which results in improved state management, less application overhead, and faster performance.

Dynamic objects are instantiated at runtime and all dynamic objects utilize a single set of code. The dynamic object is a collection of classes that uses a single set of code for all applications, and each application instantiates a single copy of the set of code to support multiple instances of all dynamic objects. In some embodiments, properties (or attributes) of a dynamic object are configured at instantiation via an object dictionary. Properties of a dynamic object may also be instantiated via referencing an existing dynamic object. Since dynamic objects may exhibit object persistence and may be organized in a hierarchy, the persistence and hierarchical characteristics may be configured at runtime.

Dynamic objects may also support traditional inheritance, where traditional inheritance may be one avenue used to modify behavior of the dynamic object. Traditional inheritance refers to the ability to extend the capabilities of a dynamic object without altering the core code that the dynamic object is instantiated from. A dynamic object contains exposed methods which may be used to configure parent-child relationships between objects as well as set persistence mechanisms of the dynamic object.

The dynamic object is a foundation class that provides all of the data access functionality. The dynamic object is also a container class that has the following primary collections: ObjectProperties and PropertyValues. The ObjectProperties collection contains object metadata, and the PropertyValuesTable contains property or attribute states. Multiple attribute and property buffers contain the current, filtered, original, edited, and deleted data underlying the PropertyValues. The dynamic object can be created in multiple programming languages, for example, Java and Microsoft Visual Basic. The dynamic object utilizes name/value pairs to represent the properties/values, however the underlying mechanisms can be implemented with a variety of collection mechanisms such as arrays, maps, collections, and so on.

FIG. 1 illustrates an example of a high level dynamic object 100 that stores abstract class definitions according to some embodiments. The high level dynamic object 100 may include a definition for a dynamic object 102, and the dynamic object 102 may have parent-child relationships and dependencies between various other objects. In the high level dynamic object 100, the dynamic object 102 is shown to be a parent to an object property interface 104, a collection of dynamic objects (collection dynamic object 106), a data store interface 108, a selection criteria interface 110, and a collection of property values labeled as collection PropertyValuesTable 112, which is a table including one or more property value interfaces 114. Each of the object property interface 104, the collection dynamic object 106, the data store interface 108, the selection criteria interface 110, the collection PropertyValuesTable 112 and the property value interface 114 may include properties and methods. Each of the object property interface 104, the collection dynamic object 106, the data store interface 108, the selection criteria interface 110, and the property value interface 112 are dynamic objects. FIG. 1 shows the dynamic object 102 being a parent, but other configurations may be set up where the dynamic object 102 is a child. In the embodiment of FIG. 1, one or more methods in the dynamic object 102 is utilized to configure the parent-child relationship. The dynamic object 102 further includes one or more properties in addition to one or more methods. Properties may include variables that are defined in the dynamic object; these include, for example, an object identity, object owner, object name, an object class, an object description, a persistence indicator, a read only indicator, a database table, and so on. Methods may include one or more Get operators for reading variables or data stored in the dynamic object 102; these include, for example, GetData( ), GetProperty( ), GetObjectOwner( ), GetObjectName( ), GetObjectDescription( ), and so on. Methods may also include Set operators for defining variables within the dynamic object 102; these include, for example, SetProperty( ), NewData( ), InheritAncestorProperties( ), GenerateIdentifier( ), and so on. Methods may further include Move operators for manipulating data within the dynamic object 102; these include, for example, MoveToRecord( ), MoveFirst( ), MoveNext( ), and so on.

The different Get operators may be described as follows. GetData( ) fetches data from a database where the dynamic object 102 stores data. GetProperty( ) returns a value of a property. GetObjectOwner( ) returns an owner of the dynamic object. GetObjectName( ) returns a name of the dynamic object. GetObjectDescription( ) returns a description of the dynamic object. The different Set operators may be described as follows. SetProperty( ) sets a property to a value. NewData( ) creates a new record in original and edit buffers. InheritAncestorProperties( ) executes metadata inheritance mechanism by inheriting ObjectProperties metadata from an existing instance of a dynamic object. GenerateIdentifier( ) is used to generate an identifier for the dynamic object. The different Move operators may be described as follows. MoveToRecord( ) moves a record pointer to a specified record in the edit buffer. MoveFirst( ) moves a record pointer to the first record in the edit buffer. MoveNext( ) moves a record pointer to the next record in the edit buffer.

The high level dynamic object 100 contains the object definition along with multiple data buffers to control the standard create, read, update, and delete style persistence mechanisms. These buffers may include an original buffer, a filter buffer, an edit buffer, and a delete buffer. The original buffer may be used to hold property values at object instantiation. The edit buffer may be used to hold property values of objects with values that have changed since object instantiation. The delete buffer may be used to mark property values that have been removed from an instantiated object. Utilizing these multiple buffers, the high level dynamic object 100 is able to create, read, update, and delete property values during runtime.

The dynamic object 102 may have methods that point to the object property interface 104. The object property interface 104 may have properties and methods. Properties of the object property interface 104 may include several variables including a property identity, a property name, a property description, and so on. Methods under the object property interface 104 may include one or more Get operators for reading variables or data stored in the object property interface 104.

The dynamic object 102 may have methods that point to the collection dynamic object 106. Collection dynamic object 106 is a collection of dynamic objects, meaning that the collection dynamic object 106 serves as a parent to one or more dynamic objects. For example, the collection dynamic object 106 may serve as a parent to another collection dynamic object, an object property interface, a data store interface, a selection criteria interface, and a property value interface. The collection dynamic object 106 may include one or more methods to manage properties in the collection dynamic object 106 or its children. For example, the methods may include an AddProperty( ) or Remove( ) method if the collection dynamic object 106 is a parent of an object property; an AddCriterion( ) or Remove( ) method if the collection dynamic object 106 is a parent of a selection criterion object; and a HasChanged( ) or Remove( ) method if the collection dynamic object 106 is a parent of a property value object. The AddProperty( ) adds or changes a key/value pair of a dynamic object. AddCriterion( ) adds a criterion for query purposes. Remove( ) removes a key/value pair from a dynamic object. HasChanged( ) returns a value indicating whether any value in the collection has changed.

The dynamic object 102 may have methods that point to the data store interface 108. The data store interface 108 may be a dynamic object with properties and methods directed at a data store. Properties of a data store interface 108 may include a type of data store, a persistence of the data store, a maximum number of records for the data store, and so on. Methods of the data store interface 108 may include one or more Get operators.

The dynamic object 102 may have methods that point to the selection criteria interface 110. The selection criteria interface 110 may be a dynamic object with properties and methods directed at identifying which records to fetch from a data store while using one of the Get operators. Properties of the selection criteria interface 110 may include a property name, an operation, a data type, and so on. The selection criteria interface 110 may include one or more Get operators.

The dynamic object 102 may have methods that point to the property value interface 114. The property value interface 114 may be a dynamic object with properties and methods that allow access to internal property data. Properties of the property value interface 112 may include whether a property has changed, and methods of the property value interface 112 may include one or more Get operators.

The high level dynamic object 100 is a collection of objects (dynamic object 102, collection dynamic object 106, object property interface 104, property values table 112, property value interface 114, data store interface 108, and selection criteria interface 110) that store the abstract class definitions, with each dynamic object in the class inheriting its definition from an object dictionary at instantiation. Dynamic objects can also inherit their definition from existing instances of dynamic objects. This mechanism allows for storing a single instance of the data and allowing multiple objects to share the data.

The underlying storage mechanism of a dynamic object is name/value pairs along with each property's detailed definition. Each dynamic object contains the object definition along with multiple data buffers to control the standard Create, Read, Update, and Delete style persistence mechanisms. In an embodiment, the multiple data buffers may be defined in a single method, for example, an updateData( ) method which may delete all records from a delete buffer; cursor through an edit buffer, and save each record in the edit buffer; reset the delete buffer; reset all edit buffer records to not changed; and copy the edit buffer to an original buffer. The combination of the underlying data storage and the exposed methods greatly reduces the effort to generate RESTFul or WebService application programming interfaces (APIs) from dynamic objects.

Since a dynamic object can inherit its properties from either an object dictionary or from another dynamic object, an application may load a single instance of object properties that are shared across all instances of the object class. For example, in FIG. 1, an instance of a property value interface using the object dictionary 100 may refer to values stored in a parent dynamic object 102. In addition, a dynamic object can either be persistent or non-persistent. Non-persistent dynamic objects automatically pipe all data requests to their ancestors. This mechanism is referred to as the data bus. Dynamic objects may be implemented as software objects in multiple software platforms, for example, .NET, java, and so on. Each of the host development languages allow any dynamic object to contain a reference to another dynamic object. This communications mechanism can be used to pass data across object boundaries via dynamic object methods such as the SetProperty( ) and GetProperty( ) methods.

In some embodiments, dynamic objects support event based communications. For example, evoking the SetProperty( ) method in a child object raises an event. The event allows a parent object to intercept the SetProperty( ) event. This communications mechanism may be used to hook data change events and add business rules.

Figure 2:
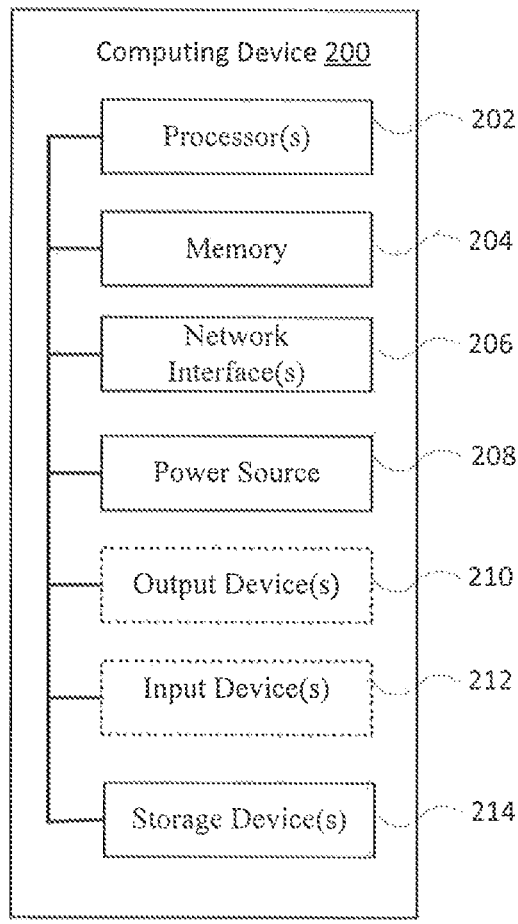
FIG. 2 illustrates components of a computing device according to some embodiments.

FIG. 2 illustrates components of a computing device 200 according to some embodiments. Computing device 200 may include one or more processors 202, memory 204, network interfaces 206, power source 208, output devices 210, input devices 212, and storage devices 214. Each component provided is interconnected physically, communicatively, and/or operatively for inter-component communications in order to realize functionality ascribed to one or more computers or devices running a dynamic application according to embodiments of the disclosure. To simplify the discussion, the singular form will be used for all components identified in FIG. 2 when appropriate, but the use of the singular does not limit the discussion to only one of each component. For example, multiple processors may implement functionality attributed to processor 202.

Processor 202 is configured to implement functions and/or process instructions for execution within the computing device 200. For example, processor 202 executes instructions stored in memory 204 or instructions stored on a storage device 214. In certain embodiments, instructions stored on storage device 214 are transferred to memory 204 for execution at processor 202. Memory 204, which may be a non-transient, computer-readable storage medium, is configured to store information within the computing device 200 during operation. In some embodiments, memory 204 includes a temporary memory that does not retain information stored when the computing device 200 is turned off. Examples of such temporary memory include volatile memories such as random access memories (RAM), dynamic random access memories (DRAM), and static random access memories (SRAM). Memory 204 also maintains program instructions for execution by the processor 202 and serves as a conduit for other storage devices (internal or external) coupled to the computing device 200 to gain access to processor 202.

Storage device 214 includes one or more non-transient computer-readable storage media. Storage device 214 is provided to store larger amounts of information than memory 204, and in some instances, configured for long-term storage of information. In some embodiments, the storage device 214 includes non-volatile storage elements. Non-limiting examples of non-volatile storage elements include floppy discs, flash memories, magnetic hard discs, optical discs, solid state drives, or forms of electrically programmable memories (EPROM) or electrically erasable and programmable (EEPROM) memories.

Network interfaces 206 are used to communicate with external devices and/or servers. The computing device 200 may include multiple network interfaces 206 to facilitate communication via multiple types of networks. Network interfaces 206 may include network interface cards, such as Ethernet cards, optical transceivers, radio frequency transceivers, or any other type of device that can send and receive information. Non-limiting examples of network interfaces 206 include radios compatible with several Wi-Fi standards, 3G, 4G, Long-Term Evolution (LTE), Bluetooth®, etc.

Power source 208 provides power to the computing device 200. For example, the device 200 may be battery powered through rechargeable or non-rechargeable batteries utilizing nickel-cadmium or other suitable material. Power source 208 may include a regulator for regulating power from the power grid in the case of a device plugged into a wall outlet, and in some devices, power source 208 may utilize energy scavenging of ubiquitous radio frequency (RF) signals to provide power to the computing device 200.

The computing device 200 may also be equipped with one or more output devices 210. Output device 210 is configured to provide output to a user using tactile, audio, and/or video information. Examples of output device 210 may include a display (cathode ray tube (CRT) display, liquid crystal display (LCD) display, LCD/light emitting diode (LED) display, organic LED display, etc.), a sound card, a video graphics adapter card, speakers, magnetics, or any other type of device that may generate an output intelligible to a user of the computing device 200. The output device 210 may display a graphical user interface of the application 402.

The computing device 200 may also be equipped with one or more input devices 212. Input devices 212 are configured to receive input from a user or the environment where the device 200 resides. In certain instances, input devices 212 include devices that provide interaction with the environment through tactile, audio, and/or video feedback. These may include a presence-sensitive screen or a touch-sensitive screen, a mouse, a keyboard, a video camera, microphone, a voice responsive system, or any other type of input device.

The hardware components described thus far for the computing device 200 are functionally and communicatively coupled to achieve certain behaviors. In some embodiments, these behaviors are controlled by software running on an operating system of the computing device 200.

Figure 3:
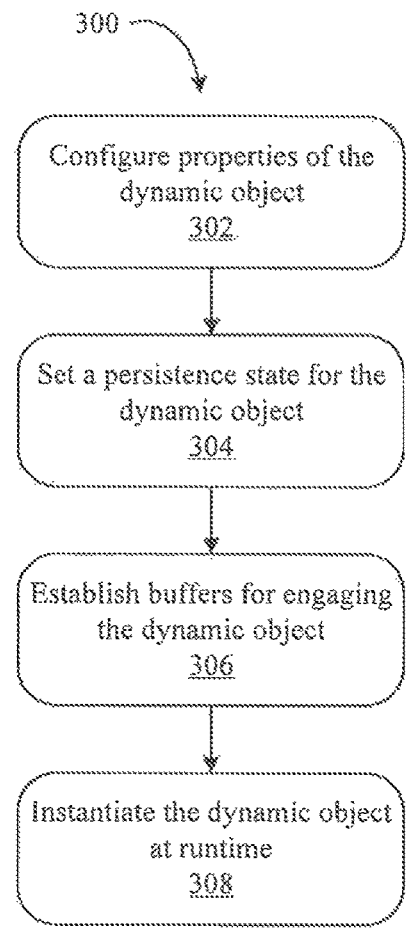
FIG. 3 illustrates a flow diagram for using a reusable dynamic object in a runtime environment.

FIG. 3 illustrates a process 300 for using a reusable dynamic object in a runtime environment. The process 300 is performed by a computing device running an application capable of instantiating one or more dynamic objects including the reusable dynamic object. Dynamic objects are instantiated at runtime. At step 302, the application configures properties of the reusable dynamic object using an object dictionary. The object dictionary includes one or more object structures, a logical to physical mapping, a persistence configuration, and object relationships for a plurality of dynamic objects. In some embodiments, configuring properties includes that the reusable dynamic object includes default properties inherited from the object dictionary. In some embodiments, configuring properties includes that the reusable dynamic object includes default properties inherited from a second dynamic object. In some embodiments, a dynamic object factory class is used to configure the dynamic object by passing values for one or more of the following properties/metadata: ObjectOwner (an owner of the object being instantiated), ObjectName (a name of the object being instantiated), ObjectSubClass (a class of the object being instantiated), ReadOnly (a Boolean indication whether the object being instantiated is read only), Static (a Boolean indication whether data in the object being instantiated is static), and Ancestor (an ancestor of the dynamic object being instantiated). Dynamic objects that are indicated as either Static or ReadOnly may automatically fetch data at instantiation. Dynamic objects that are not indicated as ReadOnly may fetch data via one or more Get methods, for example, a getData( ) method.

At step 304, the computing device sets a persistence state for the reusable dynamic object. The persistence state for the reusable dynamic object may be persistent or non-persistent. In a non-persistent state, the reusable dynamic object may pipe data requests to one or more of its ancestors. In some embodiments, the computing device sets a hierarchy state for the reusable dynamic object. The hierarchy state for the reusable dynamic object may be a parent state or a child state. In an example, the reusable dynamic object references a second dynamic object in the hierarchy and data is passed from the reusable dynamic object to the second dynamic object. In some embodiments, the reference to the second dynamic object is set using a Set property method of the reusable dynamic object. In another embodiment, the persistence state is set at instantiation via the ReadOnly property of the instantiation method or via a Set method, for example, the setReadOnly( ) method of the reusable dynamic object.

At step 306, the computing device establishes buffers for engaging the dynamic object. Step 306 involves instantiating the collection of property values (identified in FIG. 1 as collection PropertyValuesTables) that are used to execute data persistence mechanisms of the dynamic object. Some buffers that may be established include a create data buffer, a read data buffer, an update data buffer, an edit buffer, and a delete data buffer. These buffers will allow the use of various methods, such as Get and Set methods, of the reusable dynamic object.

At step 308, the computing device instantiates the reusable dynamic object at runtime. In an example, the reusable dynamic object references a second dynamic object a hierarchy, and based on activity in the runtime environment, data is passed from the reusable dynamic object to the second dynamic object. In some embodiments, the reference to the second dynamic object is set using a Set property method of the reusable dynamic object. In some embodiments, when the Set property method of the reusable dynamic object is invoked in the application to pass data from the reusable dynamic object to the second dynamic object, a parent object to the reusable dynamic object intercepts the Set property method event.

The development of dynamic objects is in response to challenges that have plagued modern software development. Dynamic objects provide the following benefits to software architects, engineers, and developers: (1) A common object dictionary that includes the object structure, logical to physical mapping, persistence configuration, and object relationships; (2) Provides methods of capturing of metadata from modeling tools; (3) A single set of code used for all dynamic objects; (4) Objects are configured and not coded; (5) A reduction in software infrastructure code development; (6) A major decrease in runtime CPU and memory resources required to run applications; (7) Rapid application and API development; and (8) Introduction of streamlined application architectures.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for using a reusable dynamic object in a runtime environment, the method comprising:
    configuring, using an object dictionary, properties of the dynamic object;
    setting a hierarchy state for the dynamic object;
    establishing a create data buffer, a read data buffer, an update data buffer, and a delete data buffer;
    setting a persistence state for the dynamic object to non-persistent;
    instantiating the dynamic object at runtime; and
    piping data requests to an ancestor of the dynamic object,
    wherein the object dictionary includes an object structure, a logical to physical mapping, a persistence configuration, and object relationships for a plurality of dynamic objects, and
    the create data buffer, the read data buffer, the update data buffer, and the delete data buffer execute data persistence mechanisms based on the persistence configuration of the dynamic object.

2. The method according to claim 1, further comprising: inheriting properties for the dynamic object from the object dictionary.

3. The method according to claim 1, further comprising: inheriting properties for the dynamic object from a second dynamic object.

4. The method according to claim 1, further comprising: setting the persistence state to persistent.

5. The method according to claim 1, further comprising: setting a reference to a second dynamic object; and passing data from the dynamic object to the second dynamic object.

6. The method according to claim 5, wherein the reference to a second dynamic object is set using a set property method.

7. The method according to claim 5, further comprising: intercepting, with a parent object to the dynamic object, a set property event when passing data from the dynamic object to the second dynamic object.

8. The method according to claim 1, further comprising: setting a Boolean indicator signifying whether the dynamic object is read only.

9. The method according to claim 1, wherein the dynamic object includes a collection of property values and a collection of object properties, wherein the collection of property values contains property states and the collection of object properties contains metadata of the dynamic object.

10. The server according to claim 1, further performing the method comprising: setting a reference to a second dynamic object; and passing data from the dynamic object to the second dynamic object.

11. The server according to claim 10, wherein the reference to a second dynamic object is set using a set property method.

12. The server according to claim 10, further performing the method comprising: intercepting, with a parent object to the dynamic object, a set property event when passing data from the dynamic object to the second dynamic object.

13. A server for using a reusable dynamic object in a runtime environment, the server including a processor and a non-transitory computer readable medium containing instructions stored thereon, such that when the instructions are executed by the processor, the server performs the method comprising:
    configuring, using an object dictionary, properties of the dynamic object;
    setting a hierarchy state for the dynamic object;
    establishing a create data buffer, a read data buffer, an update data buffer, and a delete data buffer;
    setting a persistence state for the dynamic object to non-persistent;
    instantiating the dynamic object at runtime; and
    piping data requests to an ancestor of the dynamic object,
    wherein the object dictionary includes an object structure, a logical to physical mapping, a persistence configuration, and object relationships for a plurality of dynamic objects, and
    the create data buffer, the read data buffer, the update data buffer, and the delete data buffer execute data persistence mechanisms based on the persistence configuration of the dynamic object.

14. The server according to claim 13, further performing the method comprising: inheriting properties for the dynamic object from the object dictionary.

15. The server according to claim 13, further performing the method comprising: inheriting properties for the dynamic object from a second dynamic object.

16. The server according to claim 13, further performing the method comprising: setting the persistence state to persistent.

17. A non-transitory computer readable medium for using a reusable dynamic object in a runtime environment, the non-transitory computer readable medium containing program instructions that causes a computer to perform the method comprising:
    configuring, using an object dictionary, properties of the dynamic object;
    setting a hierarchy state for the dynamic object;
    establishing a create data buffer, a read data buffer, an update data buffer, and a delete data buffer;
    setting a persistence state for the dynamic object to non-persistent;
    instantiating the dynamic object at runtime; and
    piping data requests to an ancestor of the dynamic object, wherein the object dictionary includes an object structure, a logical to physical mapping, a persistence configuration, and object relationships for a plurality of dynamic objects, and the create data buffer, the read data buffer, the update data buffer, and the delete data buffer execute data persistence mechanisms based on the persistence configuration of the dynamic object.

18. The non-transitory computer readable medium according to claim 17, further containing program instructions that causes the computer to perform the method comprising: setting a reference to a second dynamic object; and passing data from the dynamic object to the second dynamic object.

* * * * *